(12) United States Patent
Reiner et al.

(10) Patent No.: US 10,372,691 B1
(45) Date of Patent: Aug. 6, 2019

(54) PROCESSING PLATFORM WITH METRIC MAPPING FOR INTEROPERABILITY OF MULTIPLE DISTINCT MODELS

(71) Applicant: EMC IP Holding Company LLC, Hopkinton, MA (US)

(72) Inventors: David Stephen Reiner, Lexington, MA (US); Kenneth Moore, Cork (IE); John Yani Arrasjid, Boulder Creek, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 432 days.

(21) Appl. No.: 15/386,761

(22) Filed: Dec. 21, 2016

(51) Int. Cl.
*G06F 16/21* (2019.01)
*G06F 16/22* (2019.01)
*G06F 16/248* (2019.01)

(52) U.S. Cl.
CPC ............ *G06F 16/212* (2019.01); *G06F 16/22* (2019.01); *G06F 16/248* (2019.01)

(58) Field of Classification Search
CPC ....... G06F 16/248; G06F 16/212; G06F 16/22
USPC ........................................................ 707/609
See application file for complete search history.

(56) References Cited

U.S. PATENT DOCUMENTS

2009/0070771 A1* 3/2009 Yuyitung ............... G06Q 10/06
　　　　　　　　　　　　　　　　　　　　　　　　718/105
2012/0324069 A1* 12/2012 Nori ...................... G06F 9/5066
　　　　　　　　　　　　　　　　　　　　　　　　709/222

* cited by examiner

*Primary Examiner* — Evan Aspinwall
(74) *Attorney, Agent, or Firm* — Ryan, Mason & Lewis, LLP

(57) ABSTRACT

An apparatus in one embodiment comprises a processing platform comprising one or more processing devices. The processing platform implements a database configured to store metric and level information for each of a plurality of models, and a metric mapper adapted to interface with the database. The metric mapper is configured to utilize the metric and level information stored in the database to establish an association between a first metric characterizing at least one of a workload and a resource in accordance with a first one of the models and a second metric characterizing at least one of a workload and a resource in accordance with a second one of the models. The established association is illustratively applied to relate service requirements specified at least in part using the first metric of the first model to service capabilities specified at least in part using the second metric of the second model.

20 Claims, 13 Drawing Sheets

```
# For a given Level, what Metrics at that Level can be mapped directly to Metrics at a second given Level?
Show all combinations.
PREFIX rdf: <http://www.w3.org/1999/02/22-rdf-syntax-ns#>
PREFIX owl: <http://www.w3.org/2002/07/owl#>
PREFIX rdfs: <http://www.w3.org/2000/01/rdf-schema#>
PREFIX xsd: <http://www.w3.org/2001/XMLSchema#>
PREFIX dave: <http://www.semanticweb.org/reined/ontologies/2016/8/untitled-ontology-3#>
SELECT ?level1 ?metric1 ?metric2 ?level2
WHERE { ?level1 rdf:type dave:Level.
        ?level2 rdf:type dave:Level.
        ?level1 dave:HasMetric ?metric1.
        ?level2 dave:HasMetric ?metric2.
        ?metric1 dave:MapsToMetric ?metric2.}
ORDER BY ?level1 ?metric1 ?level2 ?metric2
```

FIG. 8A

```
# What Metric mapping paths of length two are possible, where the starting and ending Levels are
different?
PREFIX rdf: <http://www.w3.org/1999/02/22-rdf-syntax-ns#>
PREFIX owl: <http://www.w3.org/2002/07/owl#>
PREFIX rdfs: <http://www.w3.org/2000/01/rdf-schema#>
PREFIX xsd: <http://www.w3.org/2001/XMLSchema#>
PREFIX dave: <http://www.semanticweb.org/reined/ontologies/2016/8/untitled-ontology-3#>
SELECT ?level1 ?metric1 ?level2 ?metric2 ?level3 ?metric3
  WHERE { ?level1 rdf:type dave:Level.
          ?level2 rdf:type dave:Level.
          ?level3 rdf:type dave:Level.
          ?level1 dave:HasMetric ?metric1.
          ?level2 dave:HasMetric ?metric2.
          ?level3 dave:HasMetric ?metric3.
          ?metric1 dave:MapsToMetric ?metric2.
          ?metric2 dave:MapsToMetric ?metric3.
FILTER (?level1 != ?level3)}
ORDER BY ?level1 ?metric1 ?level3 ?metric3
```

FIG. 8B

PROCESSING PLATFORM WITH METRIC MAPPING FOR INTEROPERABILITY OF MULTIPLE DISTINCT MODELS

FIELD

The field relates generally to information processing systems, and more particularly to techniques for configuring workloads and resources in information processing systems.

BACKGROUND

Information processing systems may be configured to utilize a variety of distinct models in conjunction with configuring workloads and resources. For example, such models are often utilized to size an arrangement of resources to accommodate a given workload. The resources can include physical resources as well as virtual resources such as virtual machines and Linux containers. In many cases, the metrics utilized in various models for different types of workloads and resources are highly incompatible, leading to numerous inefficiencies in model-based configuration of workloads and resources. Such inefficiencies include the undue time and expense associated with development and utilization within a given enterprise of excessive numbers of stand-alone models that are either product-specific, level-specific or user-specific, or otherwise fail to interoperate with other models.

BRIEF DESCRIPTION OF THE DRAWINGS

FIGS. 8A and 8B show program code for processing example queries utilizing metric mappings in illustrative embodiments.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

It should also be noted that illustrative embodiments can include, without limitation, apparatus, systems, methods, and computer program products comprising processor-readable storage media.

Figure 1:
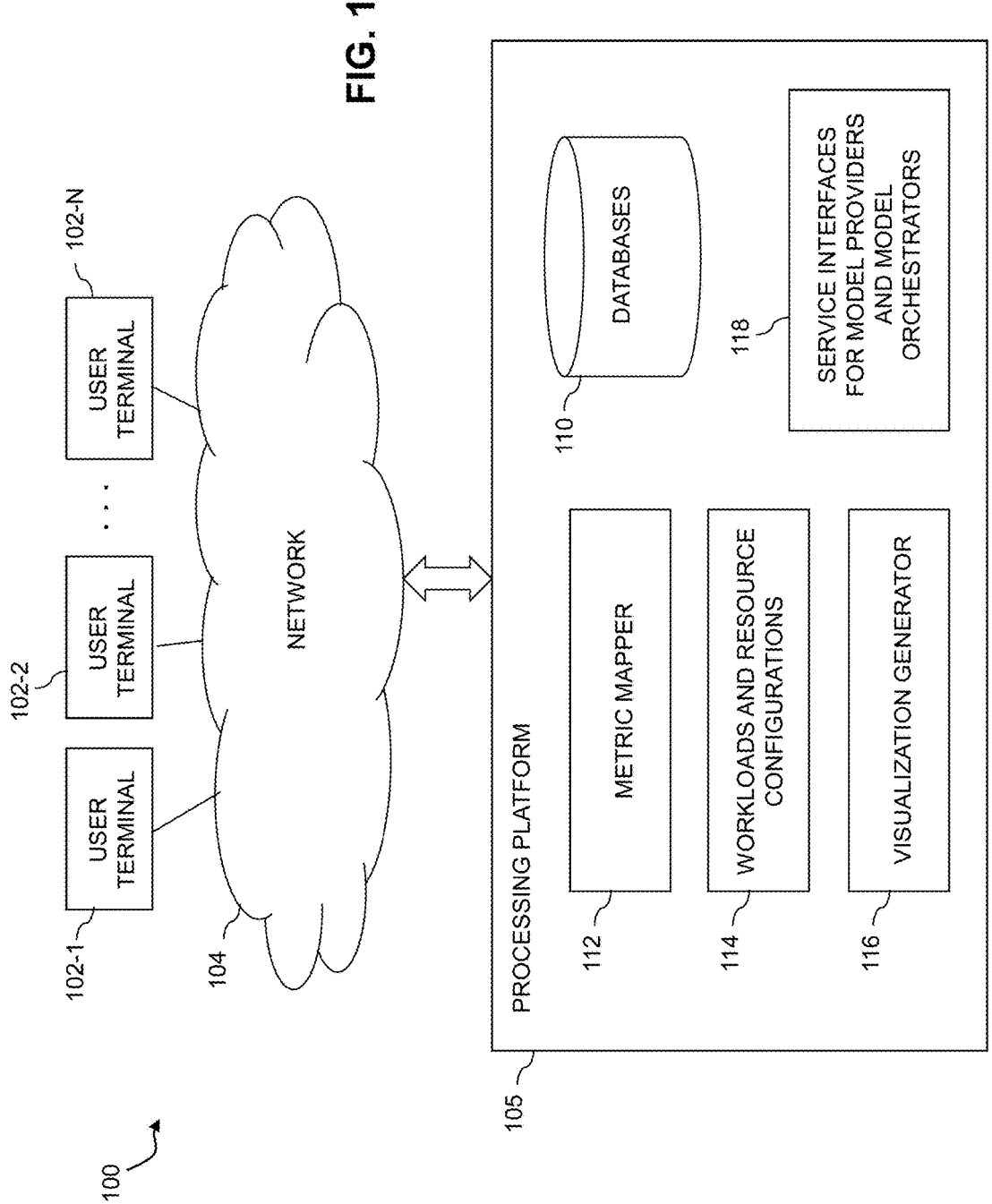
FIG. 1 is a block diagram of an information processing system implementing a metric mapper providing interoperability of multiple distinct models in an illustrative embodiment.

FIG. 1 shows an information processing system 100 configured in accordance with an illustrative embodiment. The information processing system 100 provides metric mapping functionality to provide interoperability of multiple distinct models, such as workload models, sizing models and configuration models.

In this embodiment, the system 100 more particularly comprises a plurality of user terminals 102-1, 102-2, . . . 102-N coupled to a network 104. Also coupled to the network 104 is a processing platform 105 comprising a plurality of databases 110.

The user terminals 102 can comprise, for example, desktop, laptop or tablet computers, mobile telephones, or other types of processing devices capable of communicating with the processing platform 105 over the network 104.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The processing platform in the present embodiment comprises databases 110, a metric mapper 112, workloads and resource configurations 114, a visualization generator 116 and service interfaces 118 for model providers and model orchestrators.

The processing platform 105 is assumed to be implementing using one or more processing devices each having a processor coupled to a memory. Such processing devices can illustratively include particular arrangements of compute, storage and network resources. For example, the virtual resources can include virtual machines (VMs) or Linux containers (LXCs), or combinations of both as in an arrangement in which Docker containers or other types of LXCs are configured to run on VMs.

The databases 110 illustratively comprise at least one database configured to store metric and level information for each of a plurality of models. For example, the databases 110 may comprise metric and level knowledge bases and model provider knowledge bases of the type described below in conjunction with the embodiments of FIGS. 3 and 4. However, the term "database" as used herein is intended to be broadly construed so as to encompass a wide variety of other types of information storage arrangements. For example, a database as the term is broadly used herein can comprise a rule base, a computational base of computational methods, as well as various types of object bases.

A given one of the databases 110 can comprise, for example, a NoSQL database such as MongoDB, a database utilizing Hadoop Distributed File System (HDFS) such as the HDFS databases supplied by Hortonworks or Cloudera, or other types of databases including Cassandra, HAWQ and Impala.

The databases 110 are assumed to be implemented utilizing one or more storage systems of the processing platform 105.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

The term "processing platform" as used herein is intended to be broadly construed so as to encompass multiple sets of processing devices and associated storage systems that are configured to communicate over one or more networks. For example, distributed implementations of the processing platform 105 are possible, in which certain components of the platform reside in one data center in a first geographic location while other components of the platform reside in one or more other data centers in one or more other geographic locations that are potentially remote from the first geographic location. Thus, it is possible in some implementations of the system 100 for one or more of the databases 110 to reside in a different data center than the metric mapper 112 and other platform components. Numerous other distributed implementations of the processing platform 105 are possible.

The one or more storage systems that are part of or otherwise associated with the processing platform 105 in some embodiments collectively comprise at least one data lake, such as a business data lake or BDL of a particular enterprise.

The metric mapper 112 in the FIG. 1 embodiment is configured to interface with the databases 110. More particularly, the metric mapper 112 is configured to utilize the metric and level information stored in the database to establish an association between a first metric characterizing at least one of a workload and a resource in accordance with a first one of the models and a second metric characterizing at least one of a workload and a resource in accordance with a second one of the models. The association established by the metric mapper 112 is applied in the processing platform 105 to relate service requirements specified at least in part using the first metric of the first model to service capabilities specified at least in part using the second metric of the second model.

The models utilized in the system 100 illustratively comprise workload models, sizing models and configuration models, although a wide variety of other types of models can be used in other embodiments.

Figure 6:
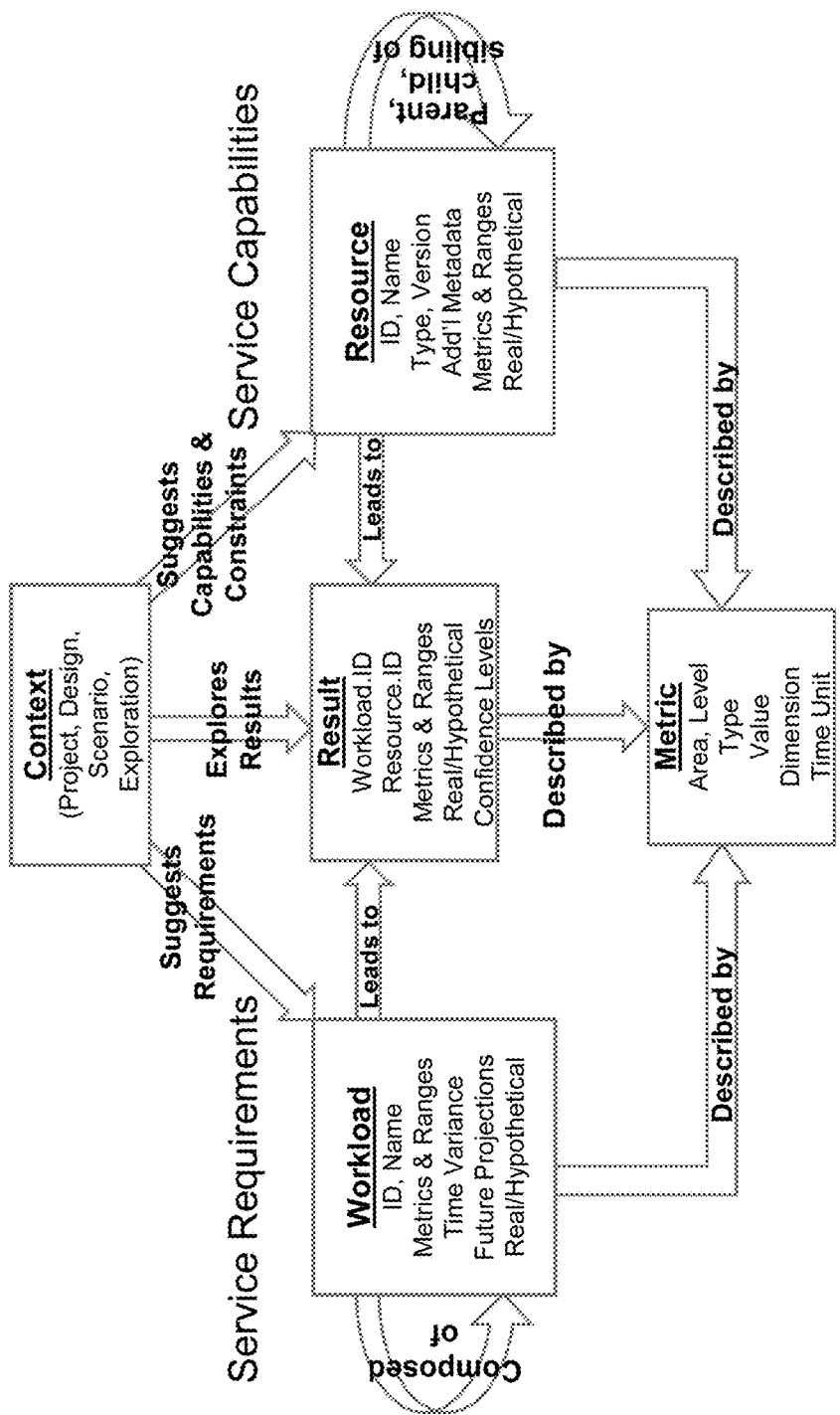
FIG. 6 is a diagram showing example relationships among elements of a model in an illustrative embodiment.

Metrics of these models can be used for workloads, capabilities, and results, as illustrated for example in the model element relationship diagram of FIG. 6, and may correspond to different dimensions, time units and levels. Certain metrics may dominate other metrics, or may be weighted differently than other metrics.

The level information utilized by the metric mapper 112 illustratively includes information indicative of at least a subset of an application level, a services level, a virtual resource level, a physical resource level and a physical component level for each of at least a subset of the plurality of models. A more detailed example of a set of levels of this type will be described below in conjunction with FIG. 5. Numerous other sets of additional or alternative levels can be used in other embodiments. Other examples of levels include user, container, VM, storage, compute, network, availability, protection, and power. In some embodiments, levels are associated with respective "views."

Metrics illustratively represent load for workloads and capacity for resource configurations. Metric mapping facilitates matching of resource configurations to workloads for system sizing and other purposes. Metrics can vary by level or view. More specific examples of metrics that may be used in illustrative embodiments include number of users, transactions per second ("transactions/sec"), input-output operations per second ("IOPS"), VMs, micro-VMs ("μVMs™"), SAP Application Performance Standard ("SAPS"), bandwidth, scalability, and power requirements. Hierarchies of sub-metrics are also possible for a given metric within each level (e.g., transactions/sec, transactions/minute, transactions/hour), and so it may be desirable in some embodiments to map dimensions and time units separately for one or more metrics.

In some embodiments, a given metric mapping process maps known or projected metrics including dimensions and time units to a desired view of the metrics including dimensions and time units.

It should be noted that "metric and level information" as the term is used herein is intended to encompass a wide variety of different types and arrangements of information characterizing metrics and levels. Although metrics can be associated with respective levels in some embodiments, a given metric is not necessarily associated with any particular level and can span multiple levels. Accordingly, a change in a level within a given model does not necessarily indicate a change in metric. Different views of the same metric can be generated for different levels within the given model.

In metric mapping, a given pair of mapped metrics may be at the same level. For example, one application metric may be mapped to another application metric. Alternatively, the mapped metrics may be on different levels. For example, a service level metric can be mapped upward to an application level metric or downward to a virtual resource level metric.

The metric mappings may be 1:n (e.g., a single metric from one model being mapped to n metrics from one or more other models), m:1 (e.g., m metrics from one or more models being mapped to n metrics from one or more other models), or m:n (e.g., m metrics from one or more models being mapped to n metrics from one or more other models).

Also, the metric mappings may be calculable using functions such as sum, min and max. It is also possible that some mappings may be inferred using defaults, rules of thumb, best practices and standard definitions, including lookups.

Some metric mappings can relate effective capacity to raw capacity. Scalability limitations and overhead, interference or bottlenecks often mean that effective capacity of configurations is less than raw capacity. On the other hand, effective capacity may be greater than raw capacity due to factors such as virtualization, dynamic resource management, and compression. Additional capacity may be linearly scalable in some cases and may top out at a maximum value. Configuration capacity may be overloaded, sometimes reflected as high or excessive utilization.

In some embodiments, the first and second models are configured to model respective workloads of the workloads and resource configurations 114. The metric mapper 112 in such embodiments is illustratively configured to associate a first workload characterized by the first metric with a second workload characterized by the second metric.

In other embodiments, the first and second models are configured to model respective resource configurations of the workloads and resource configurations 114. The metric mapper 112 in such embodiments is illustratively configured to associate a first resource configuration characterized by the first metric with a second resource configuration characterized by the second metric.

The associations established by the metric mapper can include direct associations and indirect associations. For example, the metric mapper 112 can utilize the metric and level information stored in at least one of the databases 110 to establish a direct association between the first and second metrics. As another example, the metric mapper 112 can utilize the metric and level information stored in at least one of the databases 110 to establish direct associations between each of the first and second metrics and a third metric characterizing at least one of a workload and a resource in accordance with a third one of the models so as to thereby establish an indirect association between the first and second metrics via the third metric. The third metric in this example is more generally referred to herein as an "intermediate metric." In other embodiments, indirect associations may be established between the first and second metrics utilizing multiple intermediate metrics. Any general references herein to a particular "association" established by the metric mapper 112 should be understood to encompass a direct association or an indirect association.

A given direct or indirect association established by the metric mapper 112 between a corresponding pair of metrics from respective distinct models is assumed to be utilized by the processing platform 105 in conjunction with generation of one or more of the workloads and resource configurations 114. For example, the workloads and resource configurations 114 in some embodiments are determined by the processing platform 105 based at least in part on direct or indirect associations established by the metric mapper 112.

The metric mapper 112 in some embodiments implements a plurality of metric mapping patterns. The metric mapping patterns are illustratively used to establish direct or indirect associations between metrics across multiple ones of the plurality of models and/or to establish direct or indirect associations between metrics across multiple levels within a given one of the models.

Additionally or alternatively, the metric mapper 112 can be configured to establish direct or indirect associations between metrics in respective models corresponding to respective layers of a layered composite model. One possible example of such a layered composite model will be described in more detail below in conjunction with FIG. 7.

Other possible techniques for establishing an association between first and second metrics of respective first and second models include establishing the association responsive to identification of a path between nodes in a graph representing at least a portion of the metric and level information stored in at least one of the databases 110. Other ontological representations other than graphs may be processed in a similar manner.

The associations established by the metric mapper 112 in the FIG. 1 embodiment are illustratively utilized to match service capabilities to service requirements, expressed in relevant metrics. The metric mapper 112 recognizes that different workload models, sizing models and configuration models can potentially utilize different metrics and is therefore configured with functionality for establishing associations between particular ones of the different metrics from the different models. The metric mapping logic implemented in the metric mapper 112 is separated from the individual models but is utilized to establish the associations between distinct metrics of those models.

The visualization generator 116 of the processing platform 105 in the present embodiment is configured to generate an output visualization of one or more of the associations established between the first metric and the second metric. As indicated previously, such associations can include, for example, a direct association established between the first and second metrics and one or more indirect associations established between the first and second metrics via one or more intermediate metrics.

The processing platform 105 in some embodiments is configured to update the metric and level information stored in one or more of the databases 110 in accordance with the associations established by the metric mapper 112. Additionally or alternatively, the established associations can be stored elsewhere in the system 100. For example, the established associations can be stored as part of the workloads and resource configurations 114.

The metric mapper 112 is illustratively configured in some embodiments to provide additional or alternative types of metric mapping functionality. For example, the metric mapper 112 can be configured to perform operations such as computing one or more target metrics from one or more source metrics, converting a metric representing raw capacity to a metric representing an effective capacity, leveraging metric tags, combining requirements from multiple models, generating a catalog of observed and hypothetical workloads, normalizing or otherwise representing time-variable, mixed workloads, considering configuration constraints separately or in combination, combining multiple metrics from different layers of a layered composite model, and comparing results of different models of the behavior of a particular workload on a particular resource configuration. Again, these are just examples of processing operations performed by the metric mapper 112 in some embodiments, and numerous additional or alternative processing operations can be performed in other embodiments.

In some embodiments, the processing platform 105 is configured to provide accessibility to the metric mapper 112 as a metric mapping service to at least one of a model provider and a model orchestrator. For example, model provider and model orchestrator entities can be implemented within the system 100 but external to the processing platform 105 and can access the metric mapper via corresponding ones of the service interfaces 118. Such service interfaces illustratively include graphical user interfaces (GUIs), application programming interfaces (APIs) or other types of interfaces that can allow external model providers and model orchestrators to access the metric mapper 112. A given such model provider or model orchestrator may additionally have its own GUI or API to provide user access to that entity, possibly from one or more of the user terminals 102 over the network 104.

The service interfaces 118 in some embodiments include additional service interfaces for supporting direct user access to the metric mapping functionality of the processing platform 105 via one or more of the user terminals 102. Accordingly, the service interfaces 118 are not limited solely to service interfaces for model providers and model orchestrators.

Although illustratively shown as being part of the processing platform 105 in the FIG. 1 embodiment, system components such as databases 110, workloads and resource configurations 114 and visualization generator 116 in other embodiments can be implemented at least in part externally to the processing platform 105. For example, the processing platform 105 may have access to these or other system components over the network 104 or one or more other networks of system 100.

A wide variety of different use cases of the system 100 can be supported based on implementation-specific factors such as the particular types of models, metrics, workloads, resources and other features of given embodiment.

Examples of particular use cases supported by the metric mapping functionality of the system 100 include the following:

1. Capture a description of historical or prototypical workload profiles for analysis, profiling and re-use.
2. Platform architecture and design (e.g., next-generation VxRack™, VxRail™).
3. Platform configuration reduction (e.g., choose minimal yet flexible set of resource configurations to make available).
4. Configuration sizing and performance prediction for existing or future workload or configuration growth.
5. Configuration sensitivity analysis with respect to factors such as headroom, peak periods and workload growth.
6. Configuration optimization for application performance, price, heat/power/cooling, floor space, profit, future scalability, etc.
7. Dynamic system optimization using closed loop automation (e.g., move data, place and move workloads, reschedule workloads, shift virtual resources, reconfigure load balancers).
8. Capacity planning for data centers.
9. Converged infrastructure utility offerings for customers with an understanding of cost models.
10. Reconfiguration for new or modified requirements, constraints or workload.
11. Mapping of load and capability metrics that are not directly comparable (e.g., transactions/sec to TOPS or μVMs™).
12. Use of new models for workloads or configurations together with existing ones, including refactoring.
13. Performance analysis and operational analysis of competitive products.
14. Characterization of sizing model accuracy (e.g., by comparison with known models).
15. Bottleneck analysis for workloads and configurations to detect potentially underprovisioned or misconfigured systems for a particular workload.

The above example use cases are not intended to be limiting in any way, and the system 100 can be configured in other embodiments to support additional or alternative use cases.

It is also to be appreciated that the particular arrangement of system components illustrated in FIG. 1 is exemplary only, and that numerous other arrangements of components may be used in other embodiments.

The system 100 may therefore include additional or alternative components not explicitly shown in the figure. For example, although only a single metric mapper 112 is shown in the figure, the system 100 can include multiple such metric mappers, implemented on the same or different processing platforms.

As another example, one or more of the user terminals 102 can each include a GUI, API or other type of interface to one or more corresponding service interfaces of the processing platform 105 in order to support direct user access to metric mapping functionality and associated visualizations within the system 100.

Accordingly, the particular arrangement of processing platform 105, databases 110, metric mapper 112, workloads and resource configurations 114, visualization generator 116 and service interfaces 118 in the FIG. 1 embodiment is illustrative only, and can be varied in other embodiments.

As mentioned previously, the information processing system 100 is assumed in the present embodiment to be implemented utilizing one or more processing platforms each comprising one or more processing devices. A given processing platform such as processing platform 105 can comprise various combinations of physical and virtual resources. Illustrative examples of such processing platforms that may be used to implement at least portions of the system 100 will be described in more detail below in conjunction with FIGS. 11 and 12.

Figure 2:
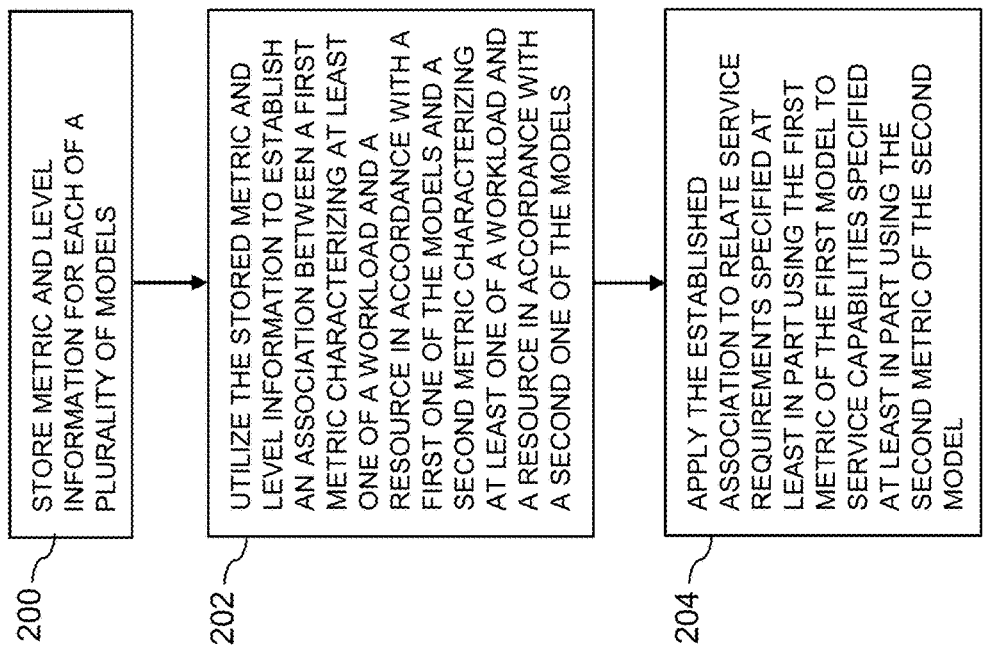
FIG. 2 is a flow diagram of an example process for metric mapping in an illustrative embodiment.

FIG. 2 shows a flow diagram of an example process for metric mapping to provide interoperability of multiple distinct models for at least one of workload and resource configuration in an information processing system. The process is illustratively performed by metric mapper 112 operating in conjunction with other system components such as databases 110, workloads and resource configurations 114, visualization generator 116 and service interfaces 118, but could be performed by numerous other types of systems. The process as shown includes steps 200, 202 and 204, although wide variety of additional or alternative metric mapping processes can be used in other embodiments.

Figure 5:
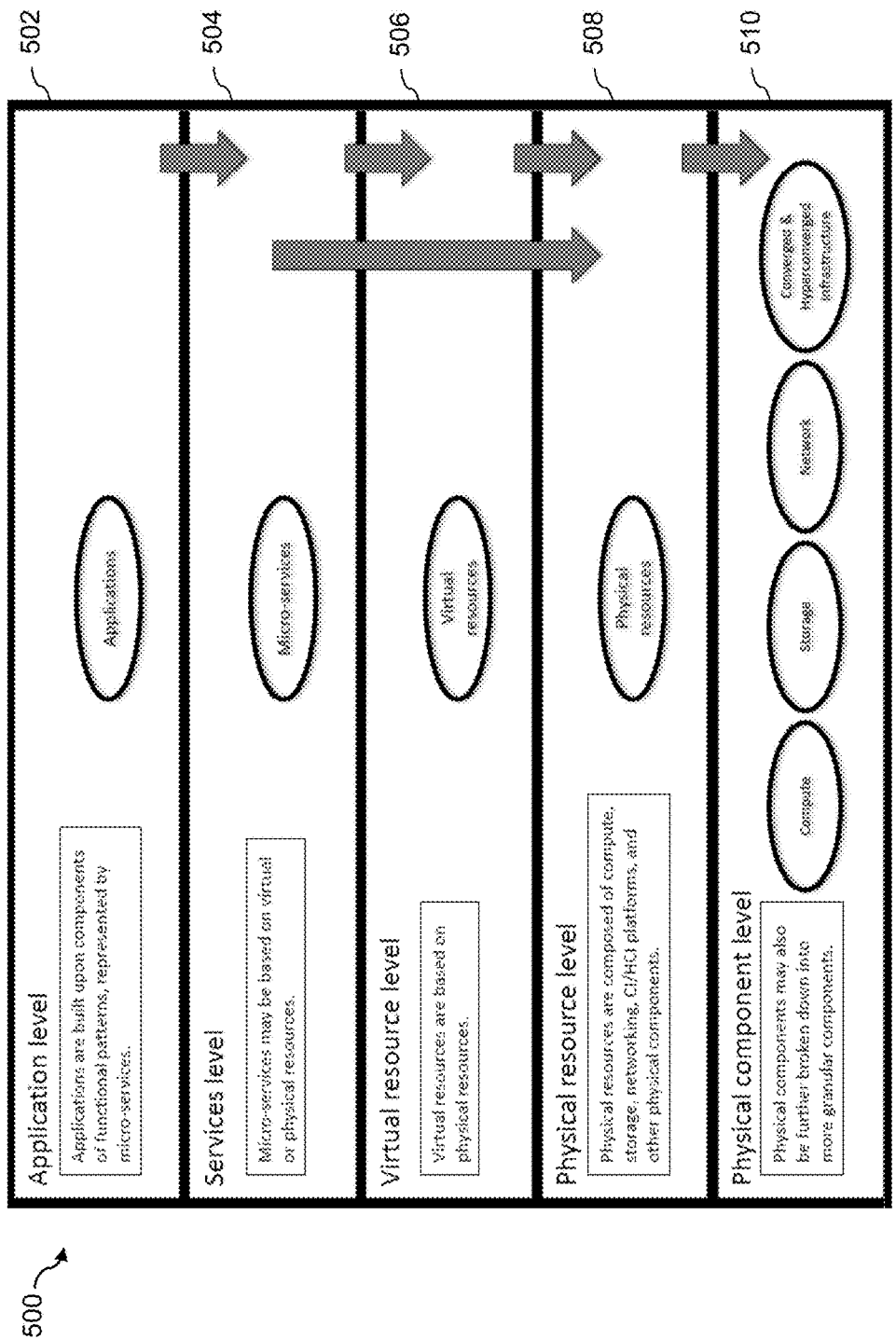
FIG. 5 shows an example of a set of levels associated with one or more models in an illustrative embodiment.

In step 200, metric and level information is stored for each of a plurality of models. The models illustratively include workload models, sizing models and configuration models, although other types of models are possible. The level information may comprise information indicative of at least a subset of an application level, a services level, a virtual resource level, a physical resource level and a physical component level for each of at least a subset of the plurality of models, as illustrated in FIG. 5, although additional or alternative level information can be used in other embodiments.

In step 202, the stored metric and level information is utilized to establish an association between a first metric characterizing at least one of a workload and a resource in accordance with a first one of the models and a second metric characterizing at least one of a workload and a resource in accordance with a second one of the models. The established association can include a direct association between the first and second metrics or an indirect association between the first and second metrics via one or more intermediate metrics possibly associated with respective additional models.

A given metric mapper such as metric mapper 112 of the FIG. 1 embodiment may implement a plurality of metric mapping patterns to establish direct or indirect associations between metrics across multiple ones of the plurality of models. Metric mapping patterns can additionally or alternatively be used by the metric mapper to establish direct or indirect associations between metrics across multiple levels within a given one of the models.

As mentioned previously, there need not be a one-to-one association between metrics and levels, and in some embodiments metric mapping may be used to generate different views of a given metric at different levels.

In step 204, the established association is applied to relate service requirements specified at least in part using the first metric of the first model to service capabilities specified at least in part using the second metric of the second model. For example, such an arrangement can allow the service requirements and service capabilities to be compared despite the otherwise incompatible metrics utilized by their respective models. In some embodiments, this illustratively involves generating an output visualization of the association established between the first metric and the second metric. Such an output visualization may include metric values for the first and second metrics.

Furthermore, the FIG. 2 process can include additional or alternative steps not explicitly shown in the figure. For example, other implementations of the process can incorporate steps such as repeating step 202 to establish one or more additional associations between respective pairs of metrics from a set of metrics including the first and second metrics and one or more additional metrics, and updating the stored metric and level information in step 200 in accordance with the established associations.

Steps 202 and 204 can therefore be repeated as needed to establish additional associations between metrics of multiple distinct models. Also, step 200 can be repeated as additional models are generated and deployed within the system and as updated metric and level information becomes available.

The particular processing operations and other system functionality described in conjunction with the flow diagram of FIG. 2 are presented by way of illustrative example only, and should not be construed as limiting the scope of the invention in any way. Alternative embodiments can use other types of processing operations for mapping metrics between multiple distinct models. For example, the ordering of the process steps may be varied in other embodiments, or certain steps may be performed at least in part concurrently with one another rather than serially.

It should be understood that functionality such as that described in conjunction with the flow diagram of FIG. 2 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

Additional aspects of illustrative embodiments implementing metric mapping processes of the type described in conjunction with FIG. 2 will now be described with reference to FIGS. 3 through 9.

Figure 3:
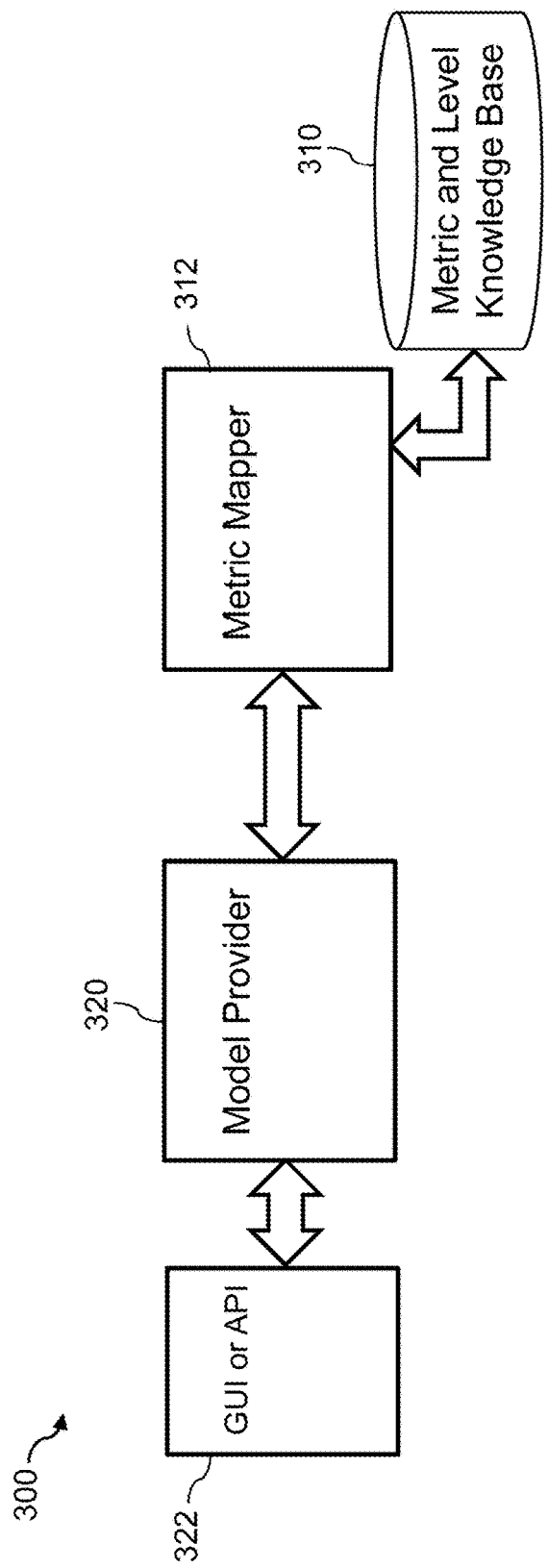
FIGS. 3 and 4 show other illustrative embodiments of information processing systems comprising metric mappers providing interoperability of multiple distinct models.

Referring initially to FIG. 3, an information processing system 300 comprises a metric and level knowledge base 310 and a metric mapper 312. The metric mapper 312 receives metric mapping requests from a model provider 320 that is accessible to one or more user terminals over a network via a GUI or API 322. The metric mapping requests may optionally include one or more models. The metric mapper 312 is configured to perform the FIG. 2 process and other metric mapping functionality similar to that previously described in conjunction with metric mapper 112 in the FIG. 1 embodiment.

The system 300 in some implementations of the FIG. 3 embodiment is configured such that the model provider 320 is providing models that model workloads. In such an embodiment, the metric mapper 312 may be more particularly configured as a workload mapper. A workload mapper of this type can be configured to map one or more workloads from a source set of metrics and levels to a target set of metrics and levels. This may in some cases involve mapping metrics between different levels. For example, an application level metric can be mapped to a virtual resource level metric. The workload mapping can involve mapping up or down a hierarchy of time units for a given metric as needed.

In other implementations, the system 300 can be configured such that the model provider 320 is providing models that model resource configurations. In such an embodiment, the metric mapper 312 may be more particularly configured as a configuration object mapper. A configuration object mapper of this type can be configured to map one or more object configurations from a source configuration view to a target configuration view. Such an arrangement can produce views of a configuration and its components that are helpful for visualization of particular use cases (e.g., the robustness of a resource configuration relative to the potential for future workload growth). Additionally or alternatively, a configuration object mapper can map across layers of granularity (e.g., converged infrastructure level to individual components), or to calculate or predict capacity.

Numerous alternative configurations of the metric mapper 312 are possible. For example, other implementations of system 300 can adapt the metric mapper 312 for use in a basic simulation/calculation framework that takes as its input a workload at one or more levels and a constrained set of configurations, and produces as its output configuration viability, performance, utilization and other operational properties. Such an arrangement can facilitate use of a variety of different metrics for effectiveness and goal optimization, while also supporting efficient exploration and analysis of what-if scenarios.

As a more detailed example, consider an implementation of system 300 configured to perform metric mapping in conjunction with sizing for a mixed workload. An initial planning stage determines target metrics and levels. The metric mapper in this implementation illustratively includes both a workload mapper and a configuration mapper. The workload mapper maps the mixed workload to a target set of metrics and levels, and the configuration mapper maps candidate configurations that meet initial constraints to a common granularity and specification. Such an arrangement supports a number of different types of comparisons, including, for example, comparing capacities across the candidate configurations, and comparing capacities of configurations to workloads using the same target set of metrics and levels or a subset of that target set of metrics and levels.

A basic simulation/calculation framework can be used in this embodiment to derive base performance and operational metrics and can provide additional links to specialized models or their results as needed.

Also, an extended modeling framework can be provided, in order to characterize effectiveness and optimize sizing (e.g., minimum cost with service level objectives (SLOs) met), again linking to specialized models or their results if needed. What-if scenarios can be generated and analyzed for factors such as sizing, component choice, competitive comparisons and sensitivity.

In these and other illustrative embodiments, a workload characterization framework may be utilized. Such a framework can be configured to determine information such as:

1. Scope of workload. This may include information relating to users (e.g., company, region, division, geography, group, lab, customers), time (e.g., past, present, future), and numerous other factors.

2. Mixture of workload components. This may include proportion of workload, rate of change, and hierarchies of workloads.

3. Description of each workload component, including applicable metrics. A given workload component may itself comprise a workload. Some workload components may comprise application profiles or functional patterns. The description for a given workload component can include information such as type of processing (e.g., batch, online, replication), application or area (e.g., Oracle, Exchange, social media, Internet of Things (IoT), high-frequency trading), an uber-metric (e.g., 100 users), time-variant and event-variant behavior (e.g., daytime only, end-of month, tax filing season), and applicable metrics to be monitored or considered, at least some of which will be subject to metric mapping.

4. Level of each metric (e.g. "view" of workload). This may include company, division, customer, group, user, application, container, VM, file, storage, database row, key-value pair, compute, network, availability, protection, power, etc.

5. Type, value, dimension, and time unit of each metric. Examples include throughput (e.g., 100 transactions/sec), bandwidth (e.g., 10 Gbps on network), response time (e.g., 2 seconds for user queries), latency (e.g., 1 second for propagation of account balance), percent (e.g., 80% read percentage), service level (e.g., zero minutes recovery point objective (RPO), 10 minutes recovery time objective (RTO), 99.999% availability), capacity (e.g., 1 TB working storage for MapReduce calculations), cost (e.g., $2/transaction), count (e.g., 249 physical cores), classification (e.g., transactional), and name (e.g., VxRail™ Appliance 200).

6. Expected or observed variability of each metric. Examples include mean, median, mode, and range, as well as time dependency (e.g., load goes down at 6 PM ET) and event dependency (e.g., transactions go up when big sale is on).

7. History and predicted future of each metric. This may include system, source (e.g., how monitored), time period (e.g., any relevant events?), historical target value (e.g., SLO), and growth rates and future predictions.

Figure 4:
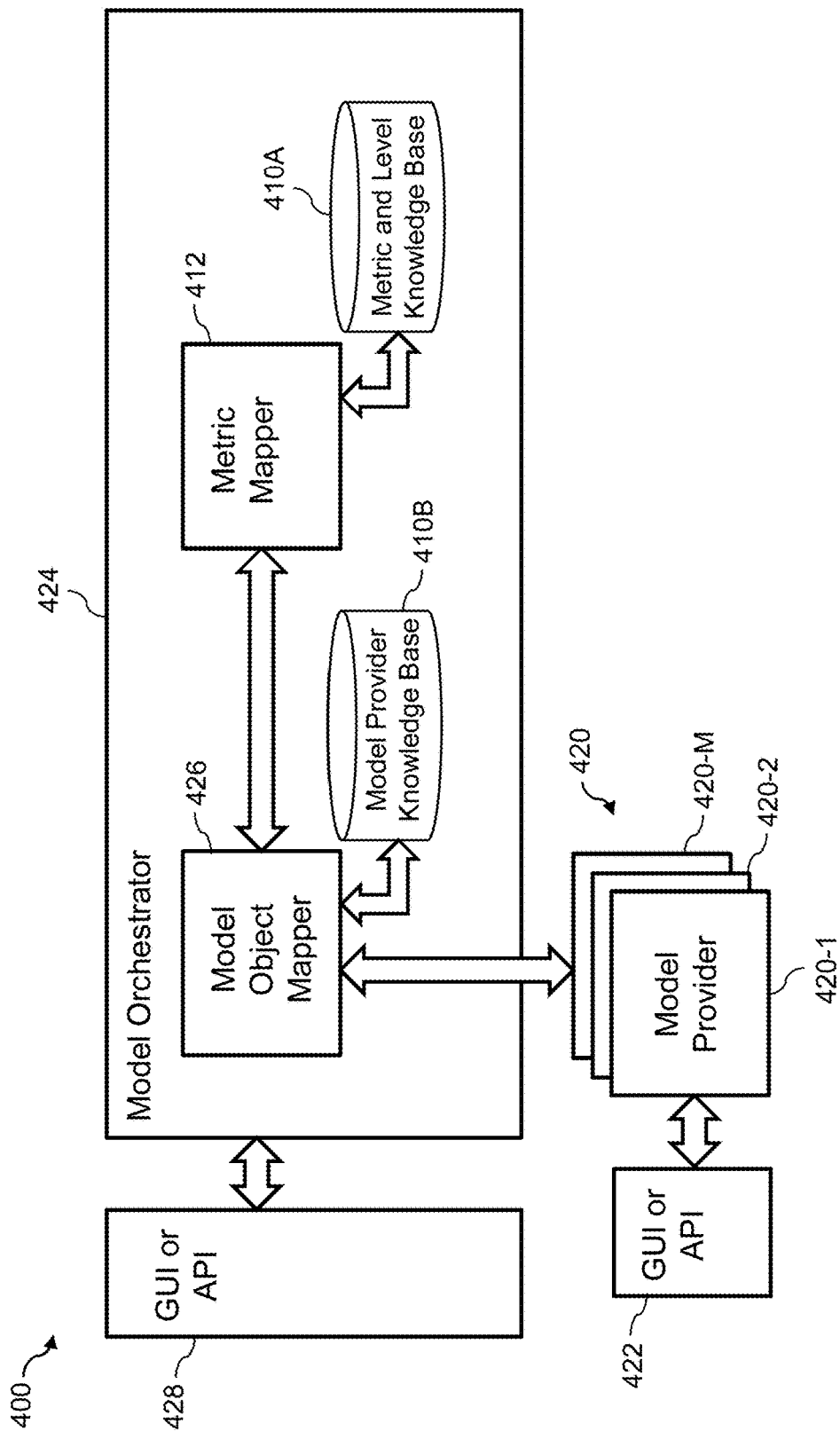

Another illustrative embodiment is shown in FIG. 4. In this embodiment, an information processing system 400 comprises a metric and level knowledge base 410A and a metric mapper 412. The system 400 further comprises a model provider knowledge base 410B. The knowledge bases 410A and 410B illustratively comprise respective distinct databases in a set of databases within or otherwise associated with a processing platform, or different parts of the same database associated with such a processing platform.

The models processed in the system 400 are received from a set of model providers 420 that more particularly include distinct model providers 420-1, 420-2, . . . 420-M. Each of the model providers 420 may have a corresponding GUI or API 422, although only a single such GUI or API associated with model provider 420-1 is shown in the figure. Alternatively, the GUI or API 422 may be associated with multiple ones of the model providers 420. The model providers 420 are accessible to one or more user terminals over a network via the GUI or API 422 or other similar GUI or API components.

The system 400 further comprises a model orchestrator 424, a model object mapper 426 and a GUI or API 428 of the model orchestrator 424. The model orchestrator 424 is accessible to one or more user terminals over a network via the GUI or API 428. The model provider knowledge base 410B of the model orchestrator 424 is configured to store information regarding the multiple distinct model providers 420 of different ones of the models processed in the system 400. The model object mapper 426 is illustratively configured to establish associations between objects in one or more models from a first one of the model providers 420 and objects in one or more other ones of the models from one or more other ones of the model providers 420. Additionally or alternatively, the model object mapper 426 can establish associations between objects within a given one of the models from one of the model providers 420.

The metric mapper 412 is configured to perform the FIG. 2 process and other metric mapping functionality similar to that previously described in conjunction with metric mapper 112 in the FIG. 1 embodiment. However, in the FIG. 4 embodiment, the metric mapper 412 is more particularly configured to utilize its metric mapping functionality to provide a metric mapping service for the model orchestrator 424.

The model orchestrator 424 comprising knowledge bases 410A and 410B in the present embodiment incorporates the metric mapper 412 and is therefore illustratively part of the same processing platform as the metric mapper 412. However, in other embodiments, the model orchestrator 424 and the metric mapper 412 may be implemented on separate processing platforms interconnected by one or more networks.

The model orchestrator 424 performs additional model processing functionality that involves utilization of the metric mapping functionality of the metric mapper 412. For example, in some embodiments the model orchestrator 424 is configured to perform operations such as linking one or more of the models to one or more other ones of the models, invoking one or more of the models from one or more other ones of the models, configuring one or more of the models for interoperability with one or more other ones of the models, combining multiple ones of the models into a composite model, and generating one or more additional models. Again, these are just examples of processing operations performed by the model orchestrator 424 in some embodiments, and numerous additional or alternative processing operations can be performed in other embodiments.

The particular arrangements of system components in illustrative embodiments such as information processing systems 300 and 400 of respective FIGS. 3 and 4 are presented by way of example only, and can be varied in other embodiments.

Referring now to FIG. 5, an example of a set of levels 500 associated with one or more models in an illustrative embodiment is shown. The levels in this embodiment more particularly comprise an application level 502, a services level 504, a virtual resource level 506, a physical resource level 508 and a physical component level 510.

The application level 502 comprises applications that are built upon components of functional patterns, illustratively represented in the present embodiment by respective instances of micro-services.

The services level 504 comprises micro-services that are based on physical or virtual resources. In other embodiments, service may be considered a separate object class, rather than a particular level of the level object class. An example of an ontology in which service is a separate object class will be described in more detail below.

The virtual resource level 506 comprises virtual resources based on physical resources.

The physical resource level 508 comprises physical resources that are composed of compute, storage, and networking components, converged infrastructure/hyper-converged infrastructure (CI/HCI) platforms, and other physical components.

The physical component level 510 comprises the above-noted compute, storage, and networking components, CI/HCI platforms, and other physical components. It is also possible for such physical components to be further broken down into more granular components.

The set of levels in this illustrative embodiment is assumed to be associated with one or more models. Each such model may specify different relationships among the levels. For example, the set of downward arrows at the far left in the figure indicates a hierarchical relationship among the levels 502 through 510 in accordance with a first model. A second model may be configured such that the service level additionally or alternatively relates directly to the physical resources level as illustrated by the additional downward arrow connecting level 504 to level 508 in the figure.

It is to be appreciated that the levels as illustrated in FIG. 5 are presented by way of example only. Numerous alternative arrangements of levels can be used to provide level information for use in metric mapping in other embodiments. For example, in some embodiments, at least some of the levels do not exhibit a hierarchical relationship and are not otherwise related to one another.

FIG. 6 shows an example of relationships among elements of a model in an illustrative embodiment. This diagram may be viewed as providing an example of an ontology. In this embodiment, a given metric describes at least one of a workload, a resource, and a result. A particular information processing context of the model suggests service requirements of the workload, which may itself be composed of other workloads, and further suggests service capabilities of the resource, which may itself have parent, child, sibling or other relationships to other resources. The service requirements of the workload and the service capabilities of the resource lead to a result which as noted above is described by one or more metrics in this particular model. Numerous alternative models having different sets of elements and different relationships among those elements can be used in other embodiments.

Figure 7:
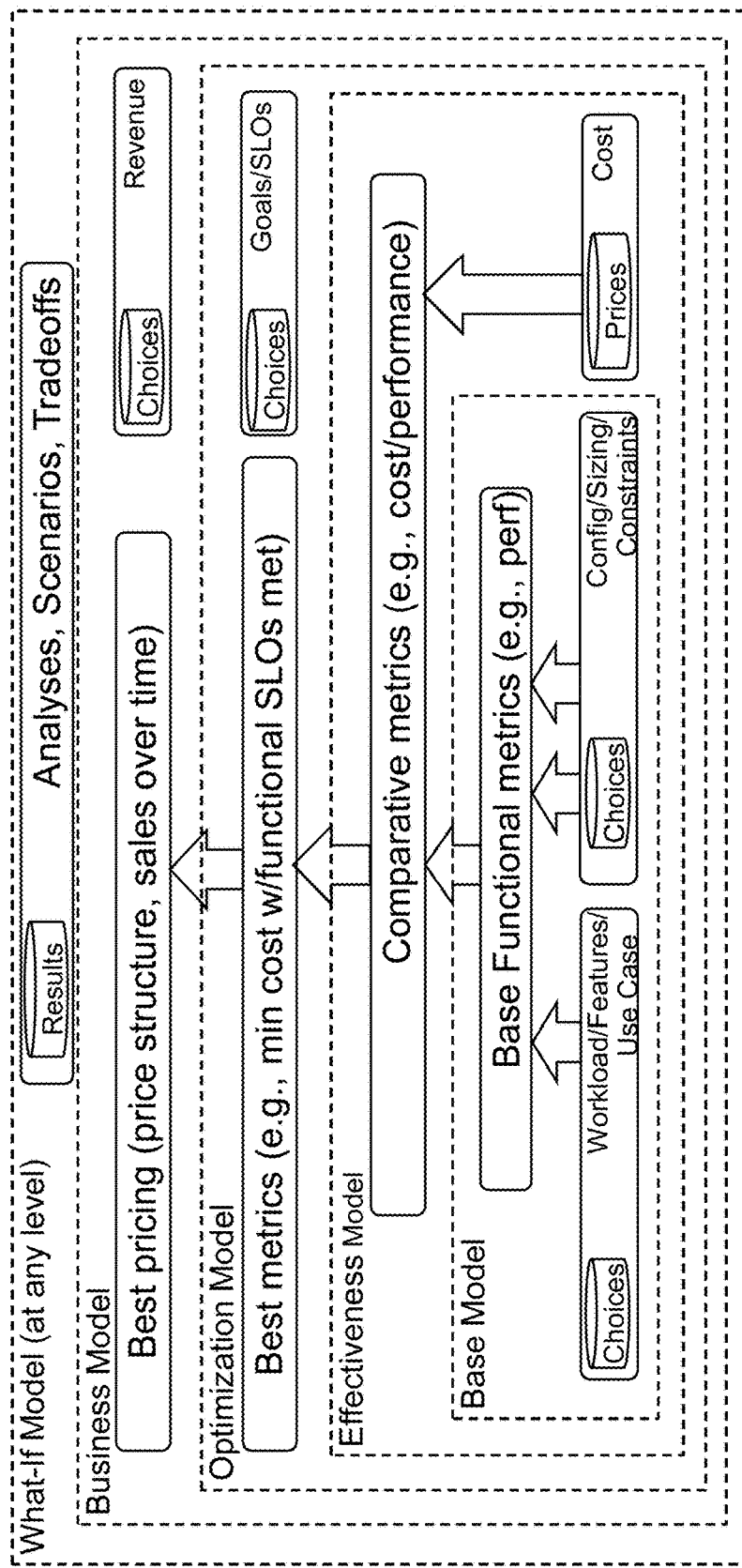
FIG. 7 shows an example of a layered composite model in an illustrative embodiment.

As mentioned previously, some embodiments can utilize layered composite models, one possible example of which is shown in FIG. 7. This layered composite model illustratively supports "what-if" modeling functionality at each of a plurality of layers. The multiple models of the layered composite model in this example include a business model that models best pricing using metrics such as price structure and sales over time, an optimization model that utilizes various best metrics such as minimum cost with functional SLOs met, an effectiveness model that utilizes comparative metrics such as cost versus performance, and a base model that utilizes base functional metrics such as performance. The base model in this example receives input parameters such as workload, workload features, workload use case, configuration, configuration sizing, and configuration constraints. The business model in this example is illustratively implemented as an internal business model of a given enterprise, and is designed to maximize enterprise revenue or to meet other enterprise goals.

The FIG. 7 layered composite model thus incorporates multiple distinct models each of which utilizes one or more different metrics. Metric mapping of the type disclosed herein can facilitate the implementation of such composite models by establishing associations between the metrics used by the different models or within a given one of the models.

A given visualization provided by visualization generator 116 can be configured to include a "slider" that provides a user with an opportunity to move upward or downward through the individual models of the layered composite model. Similar sliders can be implemented in other visualizations for allowing movement between levels of a given model such as the levels illustrated in FIG. 5. As indicated previously, the different levels in such an arrangement illustratively correspond to respective different views.

Examples of program code for processing queries utilizing metric mappings in illustrative embodiments are shown in FIGS. 8A and 8B.

These examples utilize at least portions of the following metric mapping ontology:

Level [Name]: user, app, container, VM, storage, network, compute, power, etc.

Levels in some cases can be represented as an acyclic directed graph.

A Level may have one or more Metrics and one or more Services.

Service [Name, Type]: storage access, micro-service, etc.

A Service may have one or more Metrics (e.g., transactions/sec, TOPS).

Metric [Name, Type, Value (optional), Dimension, Time Unit]

The designation of Value as optional should not be viewed as an indication that other fields are required, as this is only one example.

Type may be throughput, response time, bandwidth, ratio, or enumerated (e.g., Y/N, transactional/lookup).

View [Level, subset of Services at that Level, subset of Metrics for that Level for those Services]

An Instantiated View is a View where at least one Metric has a value.

Focus is the current View; a user may change Focus through ViewMapping.

ViewMapping: V1→V2 where V1 and V2 are Views.

ViewMapping may map Levels, Services and/or Metrics.

Path is a sequence of one or more ViewMappings.

The above metric mapping ontology is only an example, and can be varied in other embodiments. For example, although the above metric mapping ontology specifies service as a separate object class, other ontologies can be configured in which service is not specified as a separate object class but is instead considered a particular level, as in the example set of levels previously described in conjunction with FIG. 5.

The program code examples in FIGS. 8A and 8B utilize Resource Description Framework (RDF) triples, Web Ontology Language (OWL) specifications, and the SPARQL query language.

In these and other embodiments, RDF and OWL are illustratively used to describe:

Classes of objects: Level, Service, Metric.

Associations via predicates: a Level has 0-n Metrics, a Level has 0-n Services, a Service has 0-n Metrics.

Instances of classes: Application is a Level, Storage is a Level, IO is a Service at the Storage Level, IOPS is a Metric for the IO Service at the Storage Level.

Properties of Objects:

Level—has a Level_Name.

Service—has a Service_Name and a Service_Class.

Metric—has a Metric_Name, a Metric_Class, a Metric_Dimension, a Metric_Time_Unit, and an optional Metric_Value.

View has a Level, a possibly empty subset of Services for that Level, and a possibly empty subset of Metrics for the included Services.

A maximum of one View can have the property Focus.

Again, although Service is considered an object class in the above description, other embodiments can include only Metrics and Levels. A service in such an embodiment may be considered a particular level.

RDF and OWL are also illustratively used to characterize mappings in the following manner:

MetricMapping is a resource that corresponds to a Subject Metric and an Object Metric.

ViewMapping is a resource that corresponds to a Subject View and an Object View.

Path is an ordered sequence of ViewMappings.

Examples of actions and queries include the following:

Define a Level

Define Metrics for a Level

Define a View

Find Metrics for a View

Find Metric_Values for a View

Is there a MetricMapping between two Metrics?

Is there a ViewMapping between two Views?

What are the Paths between two Views?

What are the Services for a Level?

What are the Metrics for a Service?

With reference to the FIG. 8A example, this program code determines for a given specified level, such as one of the levels of the set of levels shown in FIG. 5, what metrics at that level can be mapped directly to metrics at a second given level. This may be viewed as an example of the processing performed in step 202 of the FIG. 2 process. Such processing allows subsequent computations or other processing to be performed in conjunction with relating service requirements to service capabilities in step 204 of the FIG. 2 process. For example, an association established between two metrics using the FIG. 8A program code can be utilized to compute a transformation between those metrics.

Another example is shown in FIG. 8B. In this example, the program code determines all possible metrics having indirect metric mapping paths of length two, where the starting and ending levels are different. Again, this may be viewed as an example of the processing of step 202 of FIG. 2, and enables subsequent computation or other processing in conjunction with relating service requirements to service capabilities in step 204 of FIG. 2.

The examples of FIGS. 8A and 8B assume for simplicity of illustration that the object classes include only Metric and Level, but can be extended in a straightforward manner to other object classes such as the Service class mentioned above.

Figure 9:
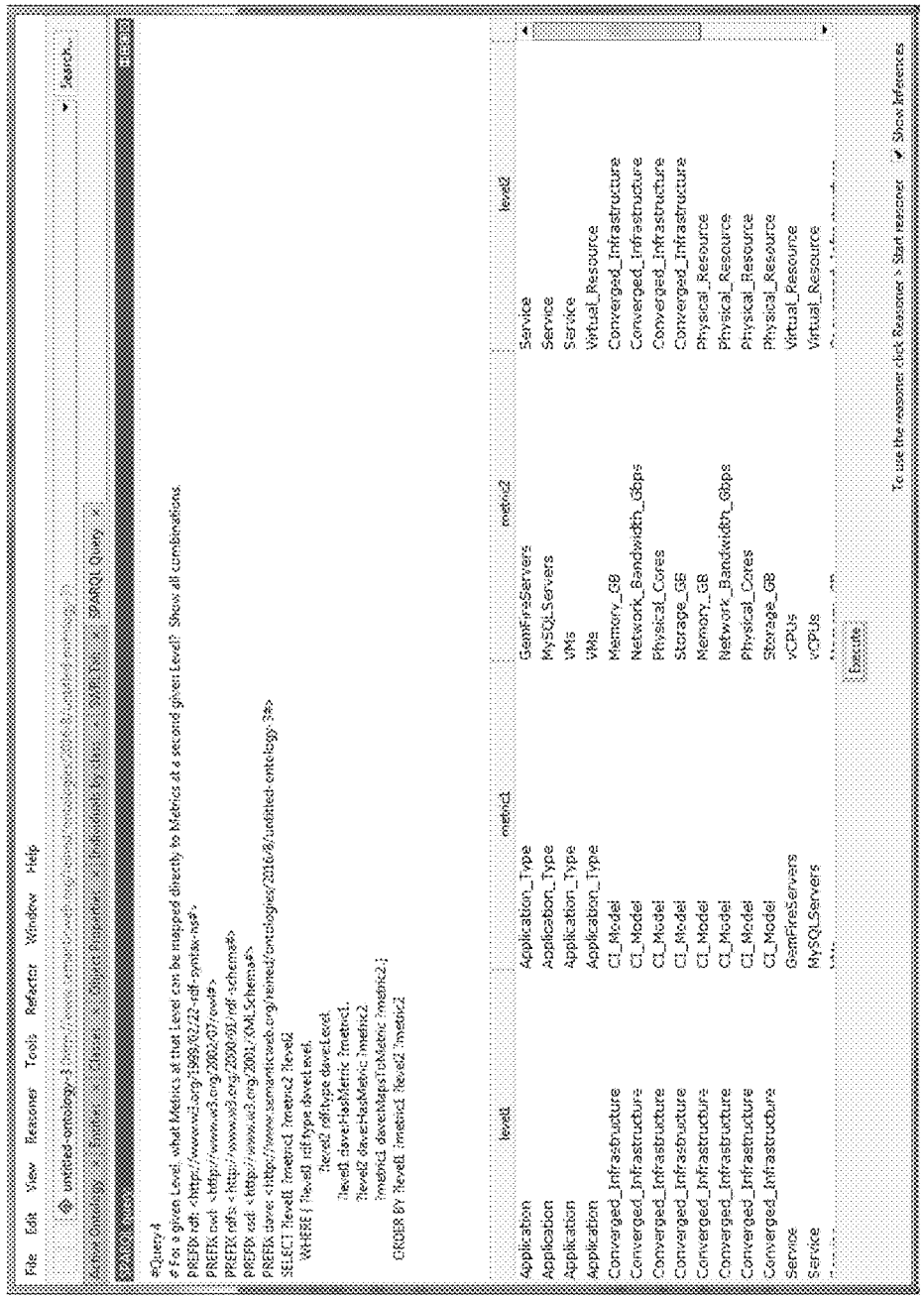
FIGS. 9 and 10 are screen shots showing examples of metric mapping visualizations generated by a processing platform in illustrative embodiments.

A screen shot illustrating an example metric mapping visualization for the FIG. 8A program code is shown in FIG. 9. The program code for processing the query is shown in an upper portion of the visualization, and the results of the processed query are shown in a lower portion of the visualization. The results indicate for particular levels which metrics of those levels can be mapped directly to metrics at other levels in accordance with associations established using metric mapping functionality as disclosed herein. Alternative views of metric mapping information including an example OWL ontology are shown in the screen shot of FIG. 10.

Figure 10:
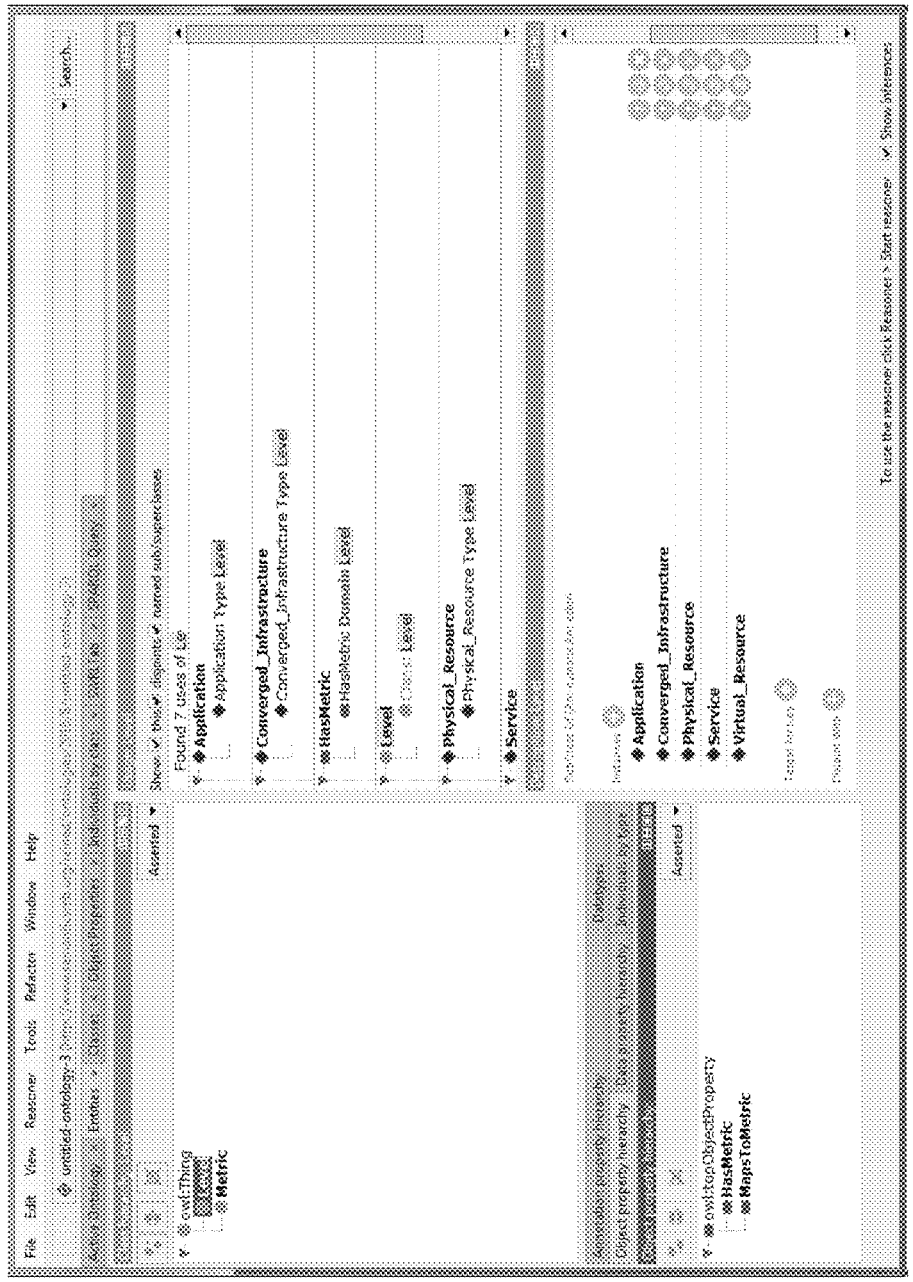

The screen shots illustrated in FIGS. 9 and 10 are assumed to be generated by a visualization generator such as visualization generator 116 of the processing platform 105 in the FIG. 1 embodiment. The visualizations in that embodiment may be accessed through one or more service interfaces of the processing platform 105 from one or more of the user terminals 102 via the network 104.

Illustrative embodiments are configured to provide a number of significant features and advantages relative to conventional arrangements.

Some embodiments provide an efficient framework for interoperability of multiple distinct models that utilize different metrics. For example, metric mapping within this framework can support direct comparison of service requirements to service capabilities, even when these service requirements and service capabilities are described within or across models by otherwise incompatible metrics.

Metric mapping in illustrative embodiments can support flexible and extensible views of different object levels (e.g., group, user, application, virtual resource, physical resource, converged infrastructure) within model providers (e.g., within workload, sizing, configuration and other models).

Illustrative embodiments provide model orchestration functionality that leverages metric mapping to link models, invoke one model from another, or otherwise allow the models to interoperate. For example, model orchestration with metric mapping can incorporate (or "wrap") existing models for new hardware, software stacks, specialized workloads, and automated workload and resource discovery at all levels.

In some embodiments, decoupling of metric mapping from specific model providers facilitates development of a metric and level knowledge base. The ensuing ability to abstract and reapply knowledge about metrics and metric mapping using the knowledge base simplifies model extensibility, development of new models, and integration of new models into system sizing processes.

Metric mapping in some embodiments is configured to combine models that represent raw capacity with those that represent effective capacity of service capabilities.

Additionally or alternatively, metric mapping in some embodiments is configured to leverage metric tags (e.g., "Applicable" with respect to context or prior customer, "Common," "Default," "Selected").

Metric mapping in illustrative embodiments allows overall sizing models to roll up multiple underlying models, possibly through additive combinations, min/max calculations, or other methods to combine results of requirements across multiple stack levels.

Metric mapping illustratively conveys the ability to compare and unify workload characterizations in a catalog of observed and hypothetical workloads.

Metric mapping in some embodiments allows workload models to represent time-variable, mixed workloads. For example, service level objectives in a workload may vary by physical time (e.g., weekend), or logical event (e.g., endof-month processing). Representation of time-variable, mixed workloads may in some cases involve normalization of those workloads.

In addition, metric mapping allows configuration constraints such as those in a release configuration matrix to be considered separately or in combination.

Metric mapping in some embodiments allows separate metrics to be combined for increasing sophistication in layered composite models (e.g., a base performance model→an effectiveness model of cost/performance→an optimization model of minimizing costs while meeting SLOs→a business model reflecting different cost-of-service-delivery metrics).

In some embodiments, identification of paths in an ontological or graph representation of metric and level information can be used to find connections among the metrics in two or more models.

It is to be appreciated that the foregoing features and advantages are illustrative of respective features and advantages provided in certain embodiments, and need not be present in other embodiments.

As mentioned previously, at least portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention, such as the information processing systems 300 and 400 of respective FIGS. 3 and 4.

Figure 11:
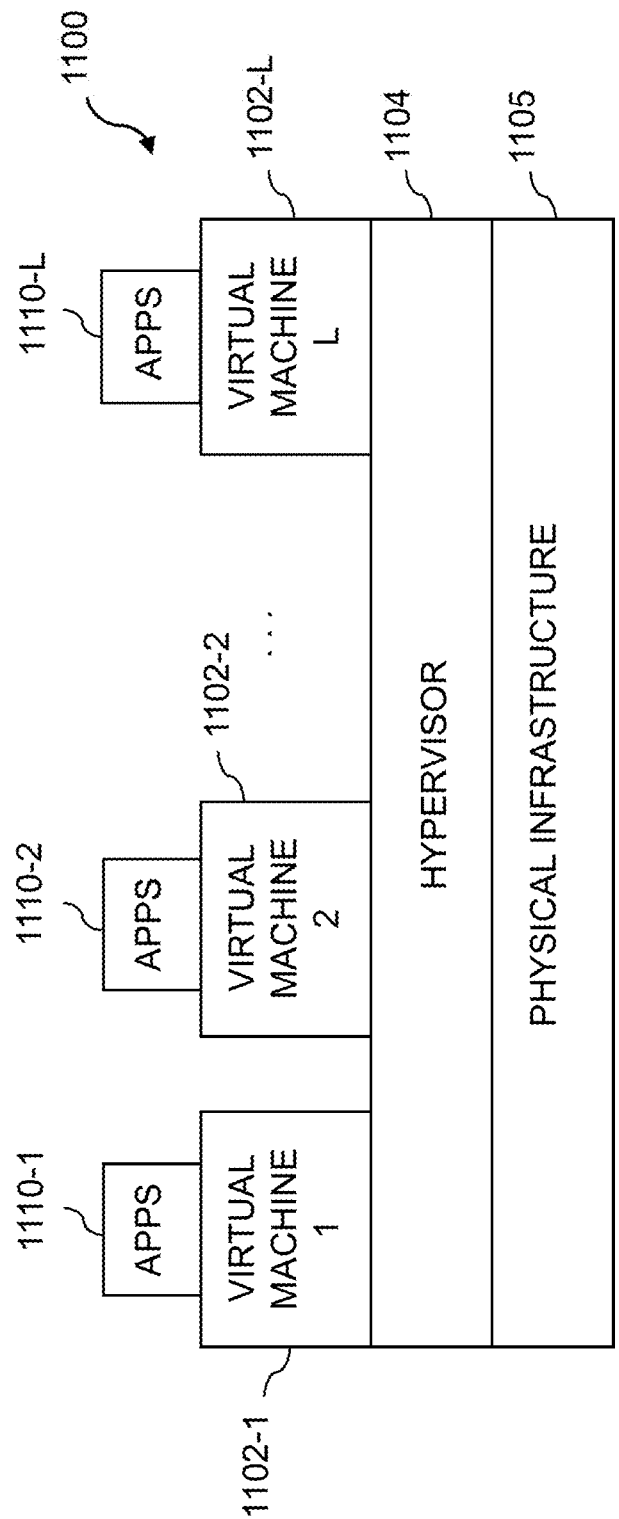
FIGS. 11 and 12 show examples of processing platforms that may be utilized to implement at least a portion of an information processing system in illustrative embodiments.
Figure 12:
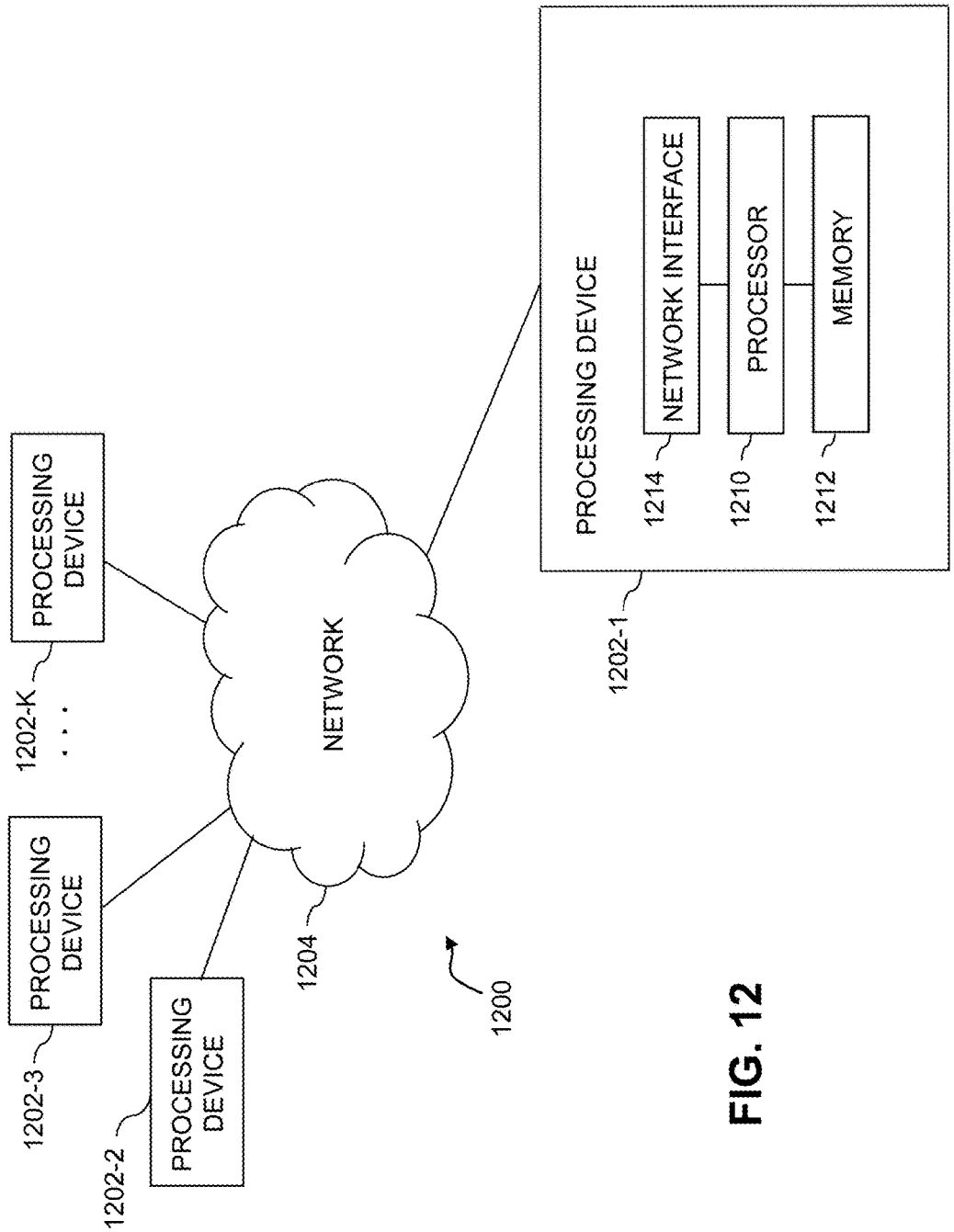

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises virtual machines (VMs) 1102-1, 1102-2, . . . 1102-L implemented using a hypervisor 1104. The hypervisor 1104 runs on physical infrastructure 1105. The cloud infrastructure 1100 further comprises sets of applications 1110-1, 1110-2, . . . 1110-L running on respective ones of the virtual machines 1102-1, 1102-2, . . . 1102-L under the control of the hypervisor 1104.

Although only a single hypervisor 1104 is shown in the embodiment of FIG. 11, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 1104 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA) or other type of processing circuitry, as well as portions or combinations of such circuitry elements.

The memory 1212 may comprise random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments are presented for purposes of illustration only. Many variations and other alternative embodiments may be used. For example, the disclosed techniques are applicable to a wide variety of other types of information processing systems in which it is desirable to implement metric mapping to provide interoperability of multiple distinct models. Also, the particular configurations of system and device elements shown in the figures can be varied in other embodiments. Thus, for example, the particular type of processing platforms, databases, metric mappers, metrics, levels, models, visualizations and other components deployed in a given embodiment and their respective configurations may be varied. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a processing platform comprising one or more processing devices each having a processor coupled to a memory;
the processing platform implementing:
a database configured to store metric and level information for each of a plurality of models; and
a metric mapper adapted to interface with the database;
wherein the metric mapper is configured to utilize the metric and level information stored in the database to establish an association between a first metric characterizing at least one of a workload and a resource in accordance with a first one of the models and a second metric characterizing at least one of a workload and a resource in accordance with a second one of the models; and
wherein the association established by the metric mapper is applied in the processing platform to relate service requirements specified at least in part using the first metric of the first model to service capabilities specified at least in part using the second metric of the second model;
the processing platform being configured to select one or more particular resource configurations to make available for execution of one or more particular workloads based at least in part on the relation of the service requirements specified at least in part using the first metric of the first model to the service capabilities specified at least in part using the second metric of the second model.

2. The apparatus of claim 1 wherein the plurality of models comprises at least one of workload models, sizing models and configuration models.

3. The apparatus of claim 1 wherein the metric mapper implements a plurality of metric mapping patterns for at least one of establishing associations between metrics across multiple ones of the plurality of models and establishing associations between metrics across multiple levels within a given one of the models.

4. The apparatus of claim 1 wherein the first and second models are configured to model respective workloads and the metric mapper associates a first workload characterized by the first metric with a second workload characterized by the second metric.

5. The apparatus of claim 1 wherein the first and second models are configured to model respective resource configurations and the metric mapper associates a first resource configuration characterized by the first metric with a second resource configuration characterized by the second metric.

6. The apparatus of claim 1 wherein the metric mapper is further configured to utilize the metric and level information stored in the database to establish direct associations between each of the first and second metrics and a third metric characterizing at least one of a workload and a resource in accordance with a third one of the models so as to thereby establish an indirect association between the first and second metrics via the third metric.

7. The apparatus of claim 1 wherein the metric mapper is further configured to utilize the metric and level information stored in the database to establish associations between metrics in respective models corresponding to respective layers of a layered composite model.

8. The apparatus of claim 1 wherein the metric mapper is further configured to perform at least one of the following operations:
to compute one or more target metrics from one or more source metrics;
to convert a metric representing raw capacity to a metric representing an effective capacity;
to leverage metric tags;
to combine requirements from multiple models;
to generate a catalog of observed and hypothetical workloads;
to represent time-variable, mixed workloads;
to consider configuration constraints separately or in combination;
to combine multiple metrics from different layers of a layered composite model; and
to compare results of different models of behavior of a particular workload on a particular resource configuration.

9. The apparatus of claim 1 wherein the database and the metric mapper are implemented at least in part in a model orchestrator of the processing platform, and wherein the model orchestrator is configured to perform at least one of the following operations:
to link one or more of the models to one or more other ones of the models;
to invoke one or more of the models from one or more other ones of the models;
to configure one or more of the models for interoperability with one or more other ones of the models;
to combine multiple ones of the models into a composite model; and
to generate one or more additional models.

10. The apparatus of claim 9 wherein the model orchestrator further comprises:
a model provider database configured to store information regarding multiple distinct providers of different ones of the models; and a model object mapper configured for one or more of:
establishing associations between objects in one or more models from a first one of the model providers and objects in one or more other ones of the models from one or more other ones of the model providers; and
establishing associations between objects within a given one of the models from one of the model providers.

11. The apparatus of claim 1 wherein establishing an association between the first metric and the second metric comprises establishing the association responsive to identification of a path between nodes in a graph representing at least a portion of the metric and level information stored in the database.

12. The apparatus of claim 1 wherein the processing platform is further configured to provide accessibility to the metric mapper as a metric mapping service to at least one of a model provider and a model orchestrator.

13. The apparatus of claim 1 wherein the level information comprises information indicative of at least a subset of an application level, a services level, a virtual resource level, a physical resource level and a physical component level for each of at least a subset of the plurality of models.

14. The apparatus of claim 1 wherein the processing platform is further configured to generate an output visualization of the association established between the first metric and the second metric wherein the established association comprises one of a direct association established between the first and second metrics and an indirect association established between the first and second metrics via one or more intermediate metrics.

15. The apparatus of claim 1 wherein the processing platform is further configured to update the metric and level information stored in the database in accordance with the association established by the metric mapper.

16. A method comprising:
storing metric and level information for each of a plurality of models;
utilizing the stored metric and level information to establish an association between a first metric characterizing at least one of a workload and a resource in accordance with a first one of the models and a second metric characterizing at least one of a workload and a resource in accordance with a second one of the models;
applying the established association to relate service requirements specified at least in part using the first metric of the first model to service capabilities specified at least in part using the second metric of the second model; and
selecting one or more particular resource configurations to make available for execution of one or more particular workloads based at least in part on the relation of the service requirements specified at least in part using the first metric of the first model to the service capabilities specified at least in part using the second metric of the second model;
wherein the storing, utilizing, applying and selecting are performed by at least one processing device having a processor coupled to a memory.

17. The method of claim 16 further comprising:
repeating the utilizing to establish one or more additional associations between respective pairs of metrics from a set of metrics including the first and second metrics and one or more additional metrics; and
updating the stored metric and level information in accordance with the established associations.

18. The method of claim 16 further comprising generating an output visualization of the association established between the first metric and the second metric wherein the established association comprises one of a direct association established between the first and second metrics and an indirect association established between the first and second metrics via one or more intermediate metrics.

19. A computer program product comprising a non-transitory processor-readable storage medium having one or more software programs embodied therein, wherein the one or more software programs when executed by at least one processing device cause said at least one processing device:
to store metric and level information for each of a plurality of models;
to utilize the stored metric and level information to establish an association between a first metric characterizing at least one of a workload and a resource in accordance with a first one of the models and a second metric characterizing at least one of a workload and a resource in accordance with a second one of the models;
to apply the established association to relate service requirements specified at least in part using the first metric of the first model to service capabilities specified at least in part using the second metric of the second model; and
to select one or more particular resource configurations to make available for execution of one or more particular workloads based at least in part on the relation of the service requirements specified at least in part using the first metric of the first model to the service capabilities specified at least in part using the second metric of the second model.

20. The computer program product of claim 19 wherein the one or more software programs when executed by said at least one processing device further cause said at least one processing device to generate an output visualization of the association established between the first metric and the second metric wherein the established association comprises one of a direct association established between the first and second metrics and an indirect association established between the first and second metrics via one or more intermediate metrics.

* * * * *